(12) United States Patent
Nakarmi et al.

(10) Patent No.: US 11,553,382 B2
(45) Date of Patent: Jan. 10, 2023

(54) KEY CHANGE PROCEDURE

(71) Applicant: Telefonaktiebolaget LM Ericsson (publ), Stockholm (SE)

(72) Inventors: Prajwol Kumar Nakarmi, Sollentuna (SE); Noamen Ben Henda, Stockholm (SE); Gunnar Mildh, Sollentuna (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 730 days.

(21) Appl. No.: 16/481,338

(22) PCT Filed: Dec. 8, 2017

(86) PCT No.: PCT/EP2017/082005
§ 371 (c)(1),
(2) Date: Jul. 26, 2019

(87) PCT Pub. No.: WO2018/137828
PCT Pub. Date: Aug. 2, 2018

(65) Prior Publication Data
US 2019/0394642 A1 Dec. 26, 2019

Related U.S. Application Data

(60) Provisional application No. 62/451,368, filed on Jan. 27, 2017.

(51) Int. Cl.
*H04W 72/04* (2009.01)
*H04W 36/00* (2009.01)
(Continued)

(52) U.S. Cl.
CPC ......... *H04W 36/0038* (2013.01); *H04W 8/08* (2013.01); *H04W 12/0471* (2021.01);
(Continued)

(58) Field of Classification Search
CPC .............. H04W 36/0038; H04W 8/08; H04W 12/0471; H04W 12/106; H04W 74/0833; H04W 76/27; H04W 80/08; H04L 63/06
See application file for complete search history.

(56) References Cited

U.S. PATENT DOCUMENTS

2013/0114813 A1* 5/2013 Chai ............... H04L 9/0827
 455/411
2014/0192985 A1* 7/2014 Wentink ......... H04W 12/0431
 380/273
(Continued)

FOREIGN PATENT DOCUMENTS

EP 2 203 008 A1 6/2010

OTHER PUBLICATIONS

International Search Report and Written Opinion dated Feb. 15, 2018 issued in International Application No. PCT/EP2017/082005. (11 pages).
(Continued)

*Primary Examiner* — Mahbubul Bar Chowdhury
(74) *Attorney, Agent, or Firm* — Rothwell, Figg, Ernst & Manbeck, P.C.

(57) ABSTRACT

There is provided mechanisms for configuring use of keys for security protecting packets communicated between a wireless device and a network node. A method is performed by the wireless device. The method comprises exchanging key use information with the network node in conjunction with performing a key change procedure with the network node during which a first key is replaced with a second key. The key use information indicates which of the packets are security protected using which of the first key and the second key.

20 Claims, 6 Drawing Sheets

(51) Int. Cl.
  *H04W 76/27* (2018.01)
  *H04W 8/08* (2009.01)
  *H04W 74/08* (2009.01)
  *H04W 80/08* (2009.01)
  *H04W 12/106* (2021.01)
  *H04W 12/0471* (2021.01)

(52) U.S. Cl.
  CPC ..... *H04W 12/106* (2021.01); *H04W 74/0833* (2013.01); *H04W 76/27* (2018.02); *H04W 80/08* (2013.01)

(56) References Cited

U.S. PATENT DOCUMENTS

| | | | | |
|---|---|---|---|---|
| 2015/0126154 A1* | 5/2015 | Yang | H04W 36/28 | 455/411 |
| 2015/0133135 A1* | 5/2015 | Zhang | H04W 12/10 | 455/450 |
| 2015/0264612 A1* | 9/2015 | Baek | H04W 76/20 | 370/331 |
| 2016/0029213 A1* | 1/2016 | Rajadurai | H04W 12/033 | 380/283 |
| 2016/0337848 A1* | 11/2016 | Chang | H04W 12/0433 | |
| 2017/0111173 A1* | 4/2017 | Sugitani | H04W 12/04 | |
| 2017/0215225 A1* | 7/2017 | Yi | H04W 12/037 | |
| 2019/0028942 A1* | 1/2019 | Tang | H04W 74/0833 | |

OTHER PUBLICATIONS

3GPP TS 33.401 V8.2.1 (Dec. 2008); 3rd Generation Partnership Project; Technical Specification Group Services and System Aspects; 3GPP System Architecture Evolution (SAE): Security Architecture; (Release 8) (Dec. 2008). (58 pages).

3GPP TS 33.401 V13.5.0 (Dec. 2016); 3rd Generation Partnership Project; Technical Specification Group Services and System Aspects; 3GPP System Architecture Evolution (SAE); Security architecture (Release 13). (149 pages).

3GPP TS 36.331 V14.0.0 (Sep. 2016); 3rd Generation Partnership Project; Technical Specification Group Radio Access Network; Evolved Universal Terrestrial Radio Access (E-UTRA); Radio Resource Control (RRC); Protocol specification (Release 14). (644 pages).

3GPP TS 36.323 V14.1.0 (Dec. 2016); 3rd Generation Partnership Project; Technical Specification Group Radio Access Network; Evolved Universal Terrestrial Radio Access (E-UTRA); Packet Data Convergence Protocol (PDCP) specification (Release 14). (39 pages).

European Patent Office Communication dated Feb. 11, 2020 issued in European Patent Application No. 17811572.1. (6 pages).

* cited by examiner

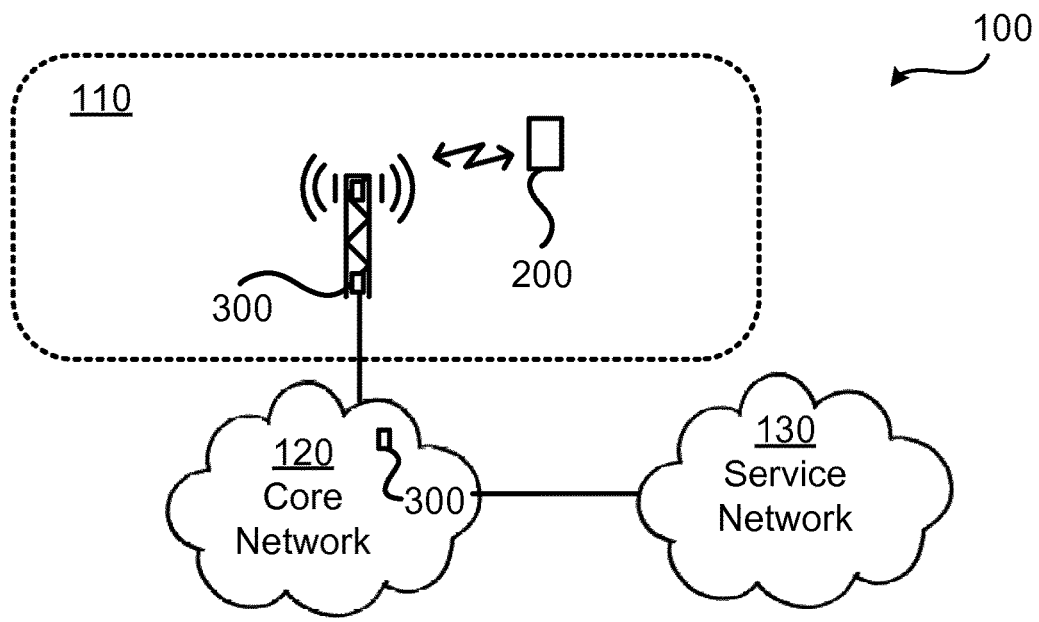
Fig. 1
S106
Exchange key use
information
Fig. 2
S206
Exchange key use
information
Fig. 4
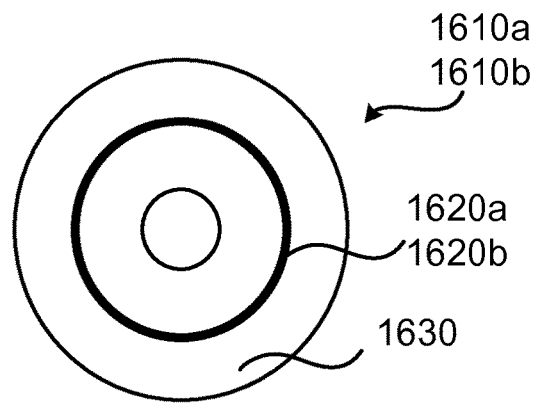
Fig. 16

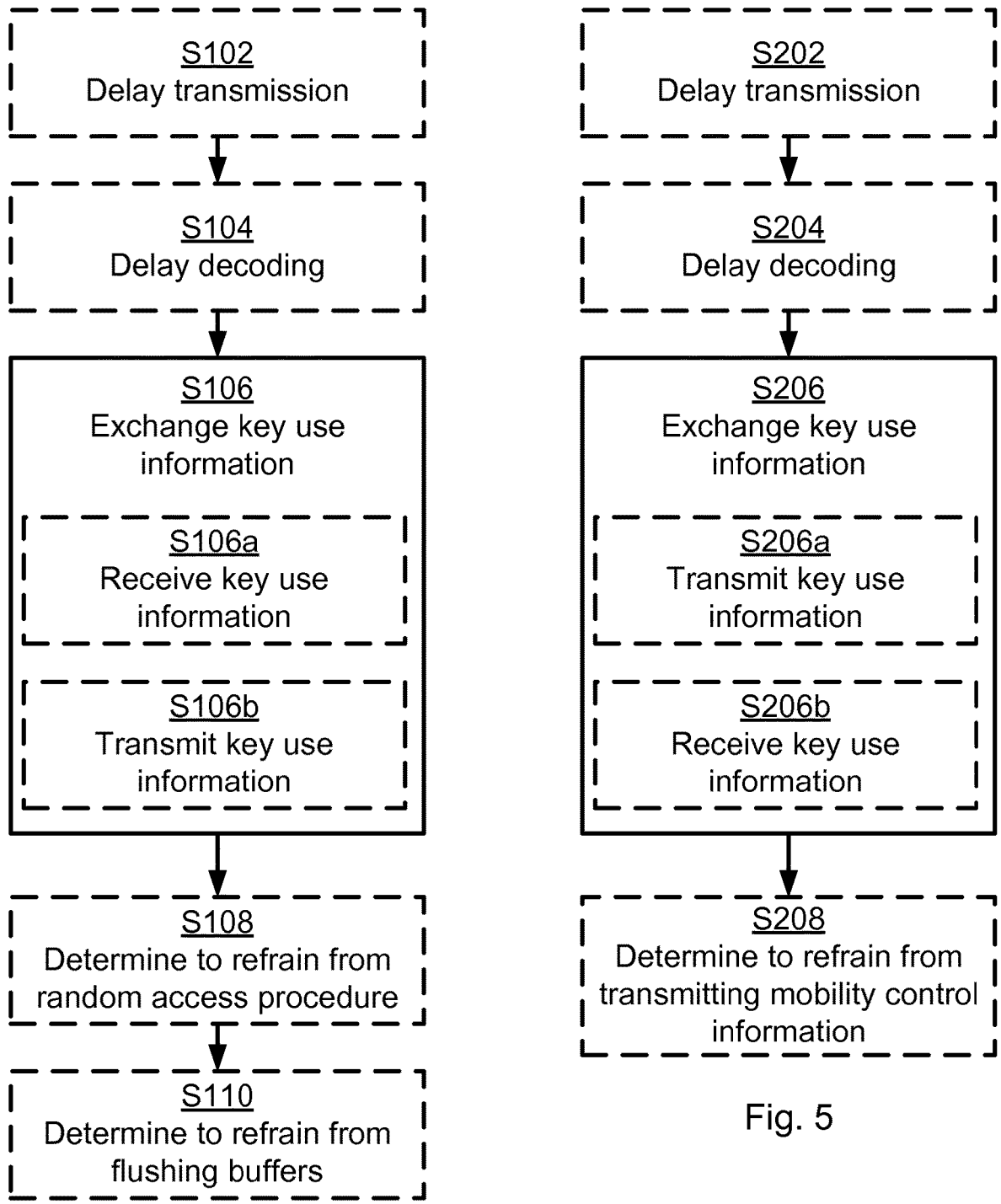

KEY CHANGE PROCEDURE

CROSS REFERENCE TO RELATED APPLICATION(S)

This application is a 35 U.S.C. § 371 National Stage of International Patent Application No. PCT/EP2017/082005, filed Dec. 8, 2017, designating the United States and claiming priority to U.S. provisional application No. 62/451,368, filed on Jan. 27, 2017. The above identified applications are incorporated by reference.

TECHNICAL FIELD

Embodiments presented herein relate to methods, a wireless device, a network node, computer programs, and a computer program product for configuring use of keys for security protecting packets communicated between the wireless device and the network node.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to communicate securely. For example, in Long Term evolution (LTE) based communications networks, the security keys (hereinafter simply referred to as keys) used for the protection of the radio interface communication are known as access stratum (AS) keys. Clause 7.2.9 of Technical specification 3GPP TS 33.401 describes mechanism in LTE based communications networks for changing the AS keys on-the-fly. The change of AS keys on-the-fly is accomplished using a procedure based on intra-cell handover (HO).

A HO for a wireless device being operatively connected to a cellular radio access network occurs when the wireless device is handed over from a source radio access network node to a target radio access network node. If the source and target radio access network nodes are interconnected, the HO is known as an X2 HO. The source radio access network node instructs the wireless device to perform a HO by sending a radio resource control (RRC) Connection Reconfiguration message. The wireless device detaches from the source radio access network node and performs random access channel (RACH) procedure with the target radio access network node. After the completion of the RACH procedure, the wireless device confirms the completion of the HO by sending a RRC Connection Reconfiguration Complete message to the target radio access network node. An intra-cell HO procedure in an LTE based communications network can logically be regarded as an X2 HO procedure where the source radio access network node and the target radio access network node are one and the same radio access network node.

Hence, in LTE based communications networks, in order to change the AS keys, the radio access network node needs to trigger the wireless device to perform an intra-cell HO, causing the wireless device to perform a RACH procedure to the same radio access network node that the wireless device was previously connected to. One reason for using this RACH procedure to the same radio access network node is to synchronize the change of AS keys between the wireless device and the radio access network node. Performing the RACH procedure causes consumption of radio resources as well as network resources and resources in the wireless device.

The wireless device and the radio access network node will apply the old key for all signaling and data transmissions prior to the RACH procedure, and the new key for all signaling and data transmissions after the RACH procedure. Thus, since encryption and integrity protection generally is applied at the Packet Data Convergence Protocol (PDCP) layer the wireless device and the radio access network node need to remove (or flush, or clear) any data currently stored in Radio Link Control (RLC)/Medium Access Control (MAC) transmit or receive buffers at the time of the RACH procedure, so that this data can be sent/resent from the PDCP layer using the new key. The RLC/MAC transmit buffers typically contains packets which are being transmitted or re-transmitted on RLC (using automatic repeat request (ARQ) transmission) or MAC levels (using hybrid automatic repeat request (HARQ) transmission). The RLC/MAC receive buffers can contain partially received packets, and/or packets received out of order.

In view of the above, there is still a need for an improved key change procedure.

SUMMARY

An object of embodiments herein is to enable efficient change of keys in conjunction with performing a key change procedure.

According to a first aspect there is presented a method for configuring use of keys for security protecting packets communicated between a wireless device and a network node. The method is performed by the wireless device. The method comprises exchanging key use information with the network node in conjunction with performing a key change procedure with the network node during which a first key is replaced with a second key. The key use information indicates which of the packets are security protected using which of the first key and the second key.

According to a second aspect there is presented a wireless device for configuring use of keys for security protecting packets communicated between the wireless device and a network node. The wireless device comprises processing circuitry. The processing circuitry is configured to cause the wireless device to exchange key use information with the network node in conjunction with performing a key change procedure with the network node during which a first key is replaced with a second key. The key use information indicates which of the packets are security protected using which of the first key and the second key.

According to a third aspect there is presented a wireless device for configuring use of keys for security protecting packets communicated between the wireless device and a network node. The wireless device comprises processing circuitry and a storage medium. The storage medium stores instructions that, when executed by the processing circuitry, cause the wireless device to exchange key use information with the network node in conjunction with performing a key change procedure with the network node during which a first key is replaced with a second key. The key use information indicates which of the packets are security protected using which of the first key and the second key.

According to a fourth aspect there is presented a wireless device for configuring use of keys for security protecting packets communicated between the wireless device and a network node. The wireless device comprises an exchange module configured to exchange key use information with the network node in conjunction with performing a key change procedure with the network node during which a first key is replaced with a second key. The key use information indicates which of the packets are security protected using which of the first key and the second key.

According to a fifth aspect there is presented a computer program for configuring use of keys for security protecting packets communicated between a wireless device and a network node. The computer program comprises computer program code which, when run on processing circuitry of a wireless device, causes the wireless device to perform a method according to the first aspect.

According to a sixth aspect there is presented a method for configuring use of keys for security protecting packets communicated between a wireless device and a network node. The method is performed by the network node. The method comprises exchanging key use information with the wireless device in conjunction with performing a key change procedure with the wireless device during which a first key is replaced with a second key. The key use information indicates which of the packets are security protected using which of the first key and the second key.

According to a seventh aspect there is presented a network node for configuring use of keys for security protecting packets communicated between a wireless device and the network node. The network node comprises processing circuitry. The processing circuitry is configured to cause the network node to exchange key use information with the wireless device in conjunction with performing a key change procedure with the wireless device during which a first key is replaced with a second key. The key use information indicates which of the packets are security protected using which of the first key and the second key.

According to an eighth aspect there is presented a network node for configuring use of keys for security protecting packets communicated between a wireless device and the network node. The network node comprises processing circuitry and a storage medium. The storage medium stores instructions that, when executed by the processing circuitry, cause the network node to exchange key use information with the wireless device in conjunction with performing a key change procedure with the wireless device during which a first key is replaced with a second key. The key use information indicates which of the packets are security protected using which of the first key and the second key.

According to a ninth aspect there is presented a network node for configuring use of keys for security protecting packets communicated between a wireless device and the network node. The network node comprises an exchange module configured to exchange key use information with the wireless device in conjunction with performing a key change procedure with the wireless device during which a first key is replaced with a second key. The key use information indicates which of the packets are security protected using which of the first key and the second key.

According to a tenth aspect there is presented a computer program for configuring use of keys for security protecting packets communicated between a wireless device and a network node, the computer program comprising computer program code which, when run on processing circuitry of a network node, causes the network node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these wireless devices, these network nodes, and these computer programs provide an efficient improved key change procedure wherein efficient change of keys is enabled in conjunction with performing the key change procedure.

Advantageously these methods, these wireless devices, these network nodes, and these computer programs enable the wireless device to not perform the RACH procedure while changing the keys. This preserves radio resources which thus could be better utilized.

Advantageously these methods, these wireless devices, these network nodes, and these computer programs avoid buffers to be flushed, leading to better resource utilization as well as better end-user performance (e.g. higher bit-rates, lower latency, etc.).

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims or enumerated embodiments as well as from the drawings.

Generally, all terms used in the claims or enumerated embodiments are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communications network according to embodiments;

FIGS. 2, 3, 4, and 5 are flowcharts of methods according to embodiments;

FIG. 16 shows one example of a computer program product comprising computer readable means according to an embodiment.

DETAILED DESCRIPTION

Figure 6:
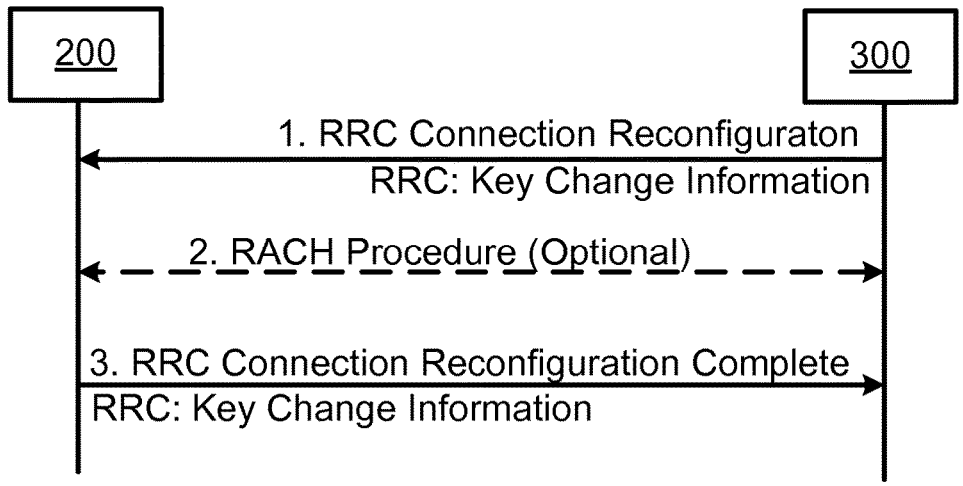
FIG. 6 is a signalling diagram according to an embodiment.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications network 100 where embodiments presented herein can be applied. The communications network 100 comprises a radio access network 110 comprising at least one network node 300, a core network 120, and a service network 120. Each of network nodes 300 could be provided as a radio access network node, radio base station, base transceiver station, node B, evolved node B, access node, or access point. Depending on the implementation of the network node 300, at part of its functionality may be provided in the radio access network 110 and part may be provided in the core network 120.

The network node 300 provides network access to the communications network 100 for wireless devices 200. The wireless device 200 could be provided as a portable wireless device, mobile station, mobile phone, handset, wireless local loop phone, user equipment (UE), smartphone, laptop computer, tablet computer, wireless mode, sensor, machine type communications (MTC) device, a Bandwidth reduced Low complexity (BL) device, a Coverage Enhancement (CE) device, or any combination thereof.

By being operatively connected to the radio access network 110 via the network node 300 the wireless device 200 has network access and is thereby enabled to access services and exchange data with the service network 130. There could therefore be a requirement for the wireless device 200 and the network node 300 to communicate securely with each other, thus requiring a key change procedure to be performed.

As mentioned above, one issue with the current key change procedure is that RACH procedure consumes the radio resources that could otherwise be better utilized. In future fifth generation telecommunications systems, communication security is expected to have high demands. Therefore, the frequency of changing the keys is expected to increase compared to in current telecommunications system. Further, the number of wireless devices 200 is also expected to increase, meaning that the consumption of radio resources because of additional RACH procedures for each key change will get worse.

As mentioned above, another issue with the current key change procedure is that any partial data in the receive buffers need to be deleted, requiring a need for sending it over the radio. Future fifth generation telecommunications systems could support services with such latency requirements and/or reliability requirements that the service will be affected in a negative way by deletion of data in receive buffers.

The embodiments disclosed herein thus relate to mechanisms for configuring use of keys for security protecting packets communicated between the wireless device 200 and the network node 300. In order to obtain such mechanisms there is provided a wireless device 200, a method performed by the wireless device 200, a computer program product comprising code, for example in the form of a computer program, that when run on processing circuitry of the wireless device 200, causes the wireless device 200 to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

FIGS. 2 and 3 are flowcharts illustrating embodiments of methods for configuring use of keys for security protecting packets communicated between the wireless device 200 and the network node 300 as performed by the wireless device 200. FIGS. 4 and 5 are flowcharts illustrating embodiments of methods for configuring use of keys for security protecting packets communicated between the wireless device 200 and the network node 300 as performed by the network node 300. The methods are advantageously provided as computer programs 1620a, 1620b.

Briefly, at least some of the herein disclosed embodiments are based on the wireless device 200 and the network node 300 communicating with each other necessary key use information that will enable change of keys for security protecting packets communicated between the wireless device 200 and the network node 300 without requiring the wireless device 200 to perform a RACH procedure.

Reference is now made to FIG. 2 illustrating a method for configuring use of keys for security protecting packets communicated between the wireless device 200 and the network node 300 as performed by the wireless device 200 according to an embodiment.

S106: The wireless device 200 exchanges key use information with the network node 300 in conjunction with performing a key change procedure with the network node 300 during which a first key is replaced with a second key. The key use information indicates which of the packets are security protected using which of the first key and the second key.

Embodiments relating to the exchange of key use information as performed by the wireless device 200 will be disclosed below.

As the skilled person understands, in the presence of at least one further key, such as a third key, a fourth key, and so on, the key use information could indicate which of the packets are security protected using which of the keys used. Multiple old keys could thus be replaced by multiple new keys for security protecting the packets. That is, some packets could be security protected using a first old key, some packets using a second old key, some packets using a first new key, some packets using a second new key, and so on. Therefore the key use information could indicate which specific ones of the new keys (and/or old keys) are used for security protecting specific ones of the packets.

As the skilled person understands, there could be different ways to perform the security protection of the packets. Examples include, but are not limited to, encryption and/or integrity protection of data and/or signalling.

Embodiments relating to further details of configuring use of keys for security protecting packets communicated between the wireless device 200 and the network node 300 as performed by the wireless device 200 will now be disclosed.

Reference is now made to FIG. 3 illustrating methods for configuring use of keys for security protecting packets communicated between the wireless device 200 and the network node 300 as performed by the wireless device 200 according to further embodiments. It is assumed that step S106 is performed as described above with reference to FIG. 2 and a thus repeated description thereof is therefore omitted.

Signaling used for the key change procedure could be delivered using acknowledge mode in lower layer signalling, meaning that typically the messages of the key change procedure will be delivered although it is not guaranteed when exactly the message is delivered (e.g. due to retransmission). In some cases there may be failures to deliver the messages to the wireless device 200 e.g. due to the wireless device 200 experiencing a Radio Link Failure. In this case there are various recovery mechanisms available (e.g. timers, re-establishment procedures, etc.) which can handle such failures. During the delivery time of the messages it is possible for the network node 300 and the wireless device 200 to continue communication of uplink and/or downlink data.

In order to avoid scenarios where the receiver of the data (either uplink or downlink) receives (or decodes) packets encoded with the new key (i.e., the above mentioned second key) prior to receiving information about the new key it is possible for the sender to wait with transmitting new packets using the new key until the sender of the data is certain (with reasonable probability) that the receiver of the data has received information about the use of a new key and for which packets. For example, the wireless device 200 could be configured to wait with transmitting new uplink packets using the new key until it receives an acknowledgement during the key change procedure. Particularly, according to an embodiment the wireless device 200 is configured to perform (optional) step S102:

S102: The wireless device 200 delays transmission of those of the packets that are security protected using the second key until having exchanged the key use information (as in step S106).

In some alternative, or additional, aspects it is also possible for the receiver of packets to wait decoding packets until it receives information about which packets are using the new key. For example, the wireless device 200 could be configured to store packets until the wireless device 200 receives a message from the network node 300 containing information about which packets are transmitted with the new key. Particularly, according to an embodiment the wireless device 200 is configured to perform (optional) step S104:

S104: The wireless device 200 delays decoding of those of the packets that are received after the key change procedure until having exchanged the key use information (as in step S106).

In some aspects the key use information comprises information about which downlink packets that are transmitted with the new key, and/or which downlink packets are transmitted with the old key, enabling the change of keys without flushing buffers. Hence, according to an embodiment the wireless device 200 is configured to perform (optional) step S106a as part of step S106:

S106a: The wireless device 200 receives the key use information from the network node 300. In this case the key use information pertains to which of the first key and the second key are used for security protection of downlink packets.

In some aspects the key use information comprises information about which or uplink packets that are transmitted with the new key, and/or which uplink packets are transmitted with the old key, again enabling the change of keys without flushing buffers. Hence, according to an embodiment the wireless device 200 is configured to perform (optional) step S106b as part of step S106:

S106b: The wireless device 200 transmits the key use information to the network node 300. In this case the key use information pertains to which of the first key and the second key are used for security protection of uplink packets.

In some embodiments at least one of steps S106a and S106b are part of step S106.

As will be disclosed below, when the network node 300 sends its key use information, the network node 300 may determine not to send any mobility control information to the wireless device 200. Presence of key use information received from the network node 300 or absence of reception of mobility control information from the network node 300 can by the wireless device 200 be used to determine that the wireless device 200 is not required to perform a RACH procedure. Hence, according to an embodiment the wireless device 200 is configured to perform (optional) step S108:

S108: The wireless device 200 determines to refrain from performing a random access procedure in response to exchanging the key use information or in absence of reception of mobility control information from the network node 300 in conjunction with performing the key change procedure.

Further, presence of key use information received from the network node 300 or absence of reception of mobility control information from the network node 300 can by the wireless device 200 be used to determine that the wireless device 200 is not required to flush its buffers. Hence, according to an embodiment the wireless device 200 is configured to perform (optional) step S110:

S108: The wireless device 200 determines to refrain from flushing buffers of received packets in response to exchanging the key use information or in absence of reception of mobility control information from the network node 300 in conjunction with performing the key change procedure.

Reference is now made to FIG. 4 illustrating a method for configuring use of keys for security protecting packets communicated between the wireless device 200 and the network node 300 as performed by the network node 300 according to an embodiment.

S206: The network node 300 exchanges key use information with the wireless device 200 in conjunction with performing a key change procedure with the wireless device 200 during which a first key is replaced with a second key. The key use information indicates which of the packets are security protected using which of the first key and the second key.

Embodiments relating to the exchange of key use information as performed by the network node 300 will be disclosed below.

Embodiments relating to further details of configuring use of keys for security protecting packets communicated between the wireless device 200 and the network node 300 as performed by the network node 300 will now be disclosed.

Reference is now made to FIG. 5 illustrating methods for configuring use of keys for security protecting packets communicated between the wireless device 200 and the network node 300 as performed by the network node 300 according to further embodiments. It is assumed that step S206 is performed as described above with reference to FIG. 4 and a thus repeated description thereof is therefore omitted.

As disclosed above, in some aspects in order to avoid scenarios where the receiver of the data (either uplink or downlink) receives (or decodes) packets encoded with the new key (i.e., the above mentioned second key) prior to receiving information about the new key it is possible for the sender to wait with transmitting new packets using the new key until the sender of the data is certain (with reasonable probability) that the receiver of the data has received information about the use of a new key and for which packets. For example, the network node 300 could be configured to wait with transmitting new downlink packets using the new key until it receives an acknowledgement during the key change procedure. Particularly, according, according to an embodiment the network node 300 is configured to perform (optional) step S202:

S202: The network node 300 delays transmission of those of the packets that are security protected using the second key until having exchanged the key use information (as in step S206).

As disclosed above, in some alternative, or additional aspects, it is also possible for the receiver of packets to wait decoding packets until it receives information about which packets are using the new key. For example, the network node 300 could be configured to store packets until the network node 300 receives a message from the wireless device 200 containing information about which packets are transmitted with the new key. Particularly, according to an embodiment the network node 300 is configured to perform (optional) step S204:

S204: The network node 300 delays decoding of those of the packets that are received after the key change procedure until having exchanged the key use information (as in step S206).

As disclosed above, in some aspects the key use information comprises information about which downlink packets that are transmitted with the new key, and/or which downlink packets are transmitted with the old key, enabling the change of keys without flushing buffers. Hence, according to an embodiment the network node 300 is configured to perform (optional) step S206a as part of step S206:

S206a: The network node 300 transmits the key use information to the wireless device 200. In this case the key use information pertains to which of the first key and the second key are used for security protection of downlink packets.

As disclosed above, in some aspects the key use information comprises information about which uplink packets that are transmitted with the new key, and/or which uplink packets are transmitted with the old key, again enabling the change of keys without flushing buffers. Hence, according to an embodiment the network node 300 is configured to perform (optional) step S206b as part of step S206:

S206b: The network node 300 receives the key use information from the wireless device 200. In this case the key use information pertains to which of the first key and the second key are used for security protection of uplink packets.

In some embodiments at least one of steps S206a and S206b are part of step S106.

When the network node 300 sends its key use information, the network node 300 may determine not to send any mobility control information to the wireless device 200. Hence, according to an embodiment the network node 300 is configured to perform (optional) step S208:

S208: The network node 300 determines to refrain from transmitting mobility control information to the wireless device 200 in response to exchanging the key use information.

Aspects and embodiments equally applicable to the wireless device 200 and the network node 300 and the methods performed by the wireless device 200 and the network node 300 will now be disclosed.

There could be different types of keys. According to an embodiment the first key and the second key are access stratum keys and are used for security protecting radio interface communication between the wireless device 200 and the network node 300. The first key and the second key could thus be used for encryption and/or integrity protection of data and/or signalling sent over the radio interface between the wireless device 200 and the network node 300.

There could be different types of packets communicated between the wireless device 200 and the network node 300 and to which the security protection is to be applied. According to an embodiment the packets are PDCP layer packets. The PDCP layer may comprise higher layer messages, e.g. RRC layer messages.

There could be different types of messages used during the key exchange procedure. According to an embodiment the key exchange procedure is performed by exchanging RRC configuration messages between the wireless device 200 and the network node 300.

According to an embodiment the exchange of key use information occurs in parallel to the key change procedure. For example, the key use information could be sent in parallel to downlink PDCP message carrying an RRC Connection Reconfiguration message when sent by the network node 300 and in parallel to uplink PDCP message carrying an RRC Connection Reconfiguration Complete message when sent by the wireless device 200.

This could improve the resilience of the mechanisms of configuring use of keys for security protecting as follows. In case the PDCP Status Report message is delayed, but the receiver has received an RRC message indicating key change, the receiver can wait with decoding new packets until it receives the key use information in a PDCP Status Report message. If the receive receives the PDCP Status Report message prior to receiving the RRC messages the wireless device 200 can wait with decoding new PDCP packets until it receives an RRC message indicating that a new key should be applied (or in the uplink acknowledging the key change).

There could be different ways for the wireless device 200 and the network node 300 to exchange the key use information in steps S106 and S206, respectively. Embodiments relating thereto will now be disclosed.

According to an embodiment the key use information is exchanged using RRC layer signalling.

This embodiment is exemplified in terms of the RRC protocol in LTE (procedures, messages, and information elements) as specified in the technical specification 3GPP TS 36.331 "Evolved Universal Terrestrial Radio Access (E-UTRA); Radio Resource Control (RRC); Protocol specification". An example of using the RRC messages in the RRC Connection Reconfiguration procedure is illustrated in FIG. 6, where the network node 300 sends its key change information (step 1) to the wireless device in the downlink RRC Connection Reconfiguration message and the wireless device 200 sends its key change information to the network node 300 in the uplink RRC Connection Reconfiguration Complete message (step 3), and where the RACH procedure is optional (step 2).

Figure 7:
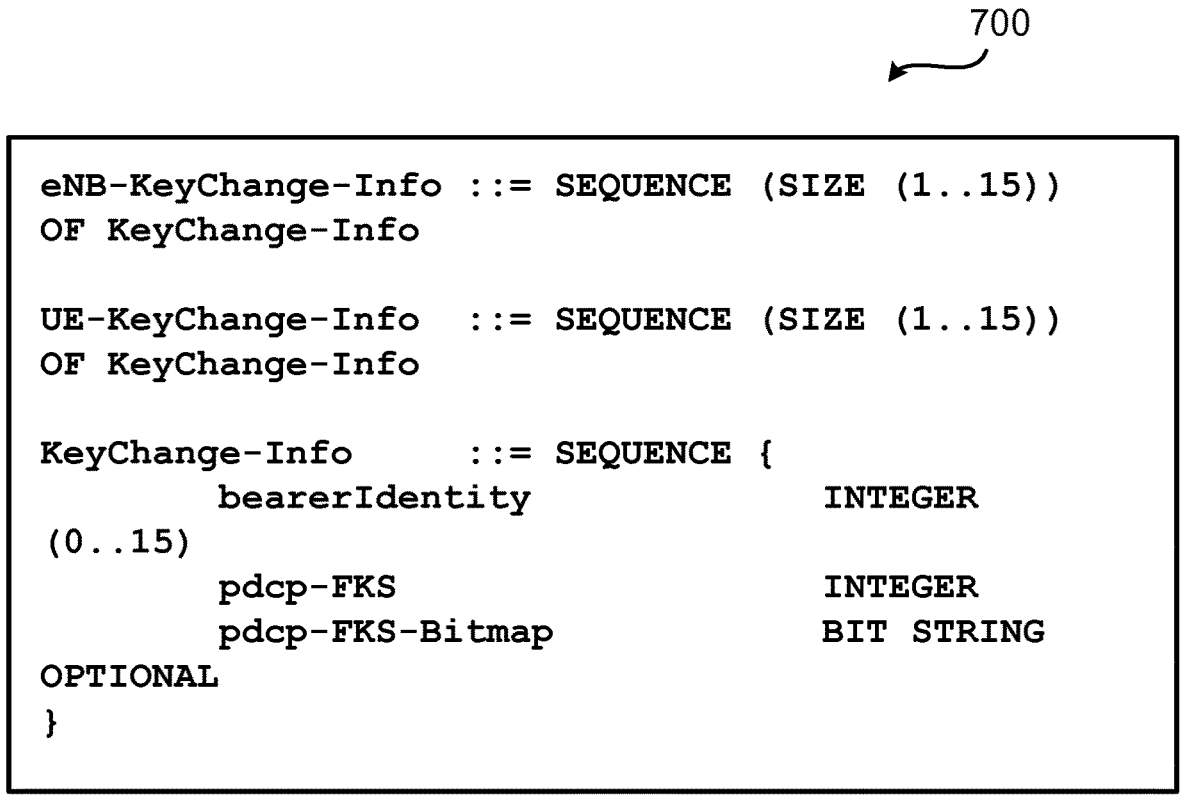
FIG. 7 is a schematic illustration of a data structure according to embodiments.

The key change information of the network node 300 and the key change information of the wireless device 200 could, for example, be encoded as an information element (IE) encoded in Abstract Syntax Notation One (ASN.1) according to the data structure 700 illustrated in FIG. 7. That IE may be, for example, added to the RRC Connection Reconfiguration message or the SecurityConfigHO IE when sent by the network node 300 and to the RRC Connection Reconfiguration Complete message when sent by the wireless device 200.

There are separate IEs for the key change information, for each bearer, which may have the following fields.

The field bearerIdentity in the IE for the key change information identifies the bearer. Additionally there could be a field that identifies the bearer type Signaling Radio Bearer (SRB) or Data Radio Bearer (DRB).

The field pdcp-FKS (meaning Packet Data Convergence Protocol (PDCP) First Key-change Sequence Number (SN)) identifies the PDCP SN of the first PDCP data unit from which the new key should start to be applied. Instead of indicating First Key-change SN, alternatively it is also possible to indicate the Last Key-old SN, i.e. the last PDCP SN using the old key.

An optional field pdcp-FKS-Bitmap, when present, identifies the specific PDCP SNs in which to use the new key. This field is used when there are PDCP data units in buffers which are out-of-sequence. The most significant bit indicates whether or not the PDCP data unit with the SN (pdcp-FKS+1) modulo (Maximum_PDCP_SN+1) uses the new key. The least significant bit indicates whether or not the PDCP data unit with the SN (pdcp-FKS+8) modulo (Maximum_PDCP_SN+1) uses the new key. The bit "0" may be used to indicate that the old key is to be used, and the bit "1" may be used to indicate that the new key is to be used.

According to an embodiment the key use information is exchanged using PDCP layer signalling.

Figure 8:
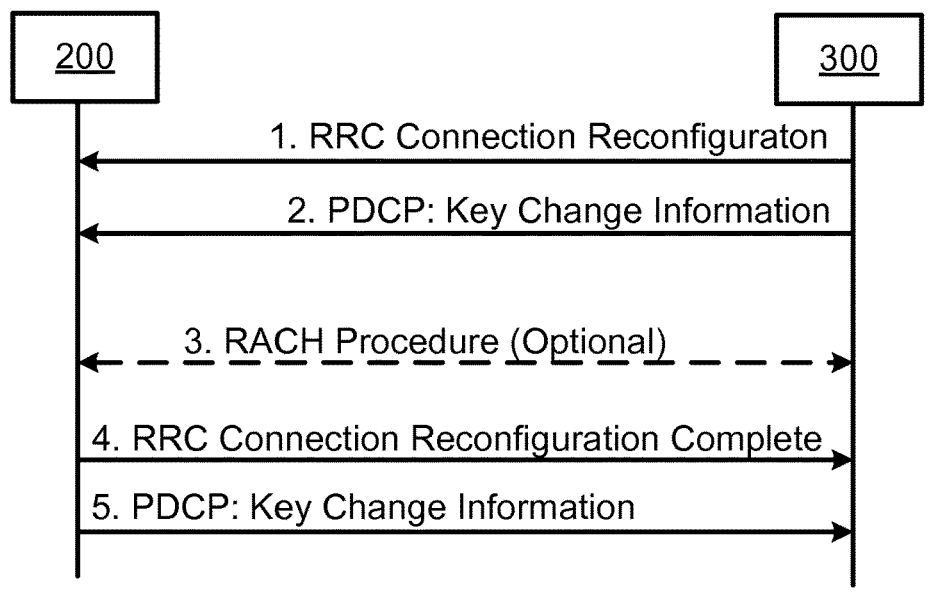
FIG. 8 is a signalling diagram according to an embodiment.

This embodiment is exemplified in terms of the PDCP protocol in LTE (procedures, messages, and information elements) as specified in the technical specification 3GPP TS 36.323 "Evolved Universal Terrestrial Radio Access (E-UTRA); Packet Data Convergence Protocol (PDCP) specification". An example of using the PDCP messages in the PDCP Status Report procedure is illustrated in FIG. 8, where the network node 300 sends its key change information to the wireless device 200 in the downlink PDCP Status Report message (step 2) after a RRC connection reconfiguration message (step 1) and the wireless device 200 sends its key change information to the network node 300 in the uplink PDCP Status Report message (step 5) after a RRC connection reconfiguration complete message (step 4), and possibly after an optional RACH procedure (step 3).

Figure 9:
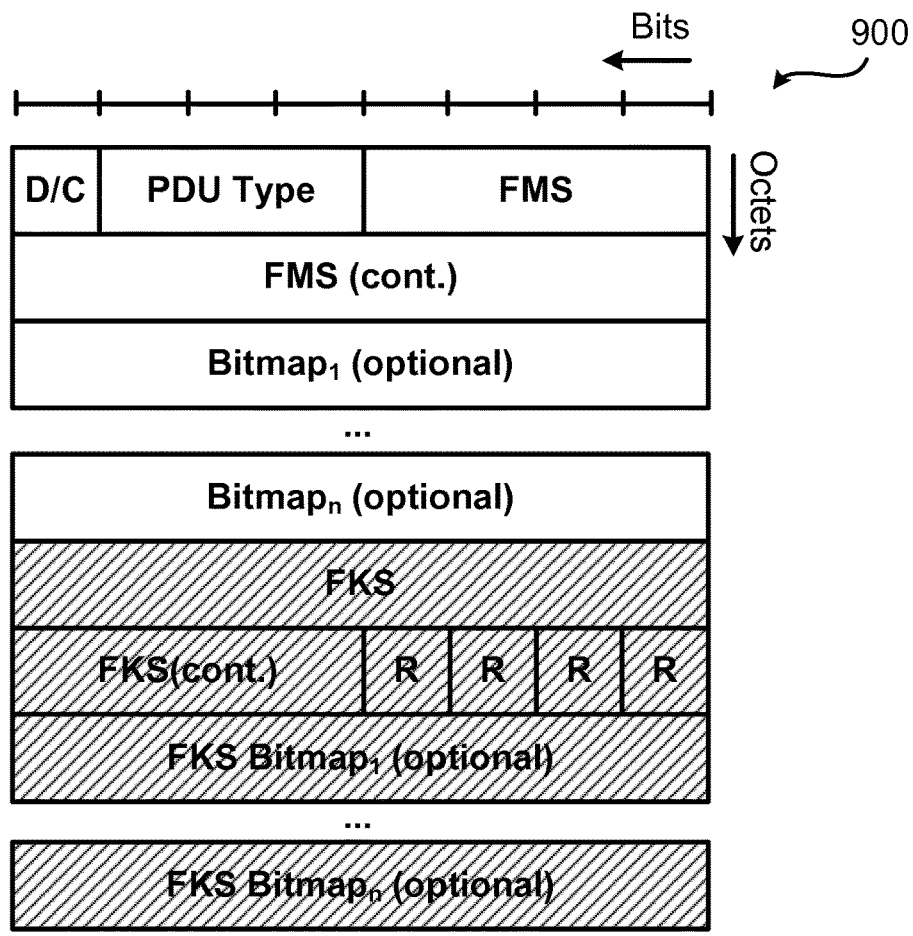
FIG. 9 is a schematic illustration of a data structure according to embodiments.

The key change information of the network node 300 and the key change information of the wireless device 200 could, for example, be encoded as shown in the data structure 900 of FIG. 9 (where the key change information indicated as boxes filled with slanted lines) in an already existing PDCP Status Report message. The key change information of the network node 300 and the key change information of the wireless device 200 could comprise PDCP information for all SRBs and DRBs the wireless device 200 has been configured with.

In FIG. 9, the length of PDCP sequence number (SN) is taken as 12 bits for example. The field FKS identifies the PDCP SN of the first PDCP data unit where the new key is to be used. The optional field FKS Bitmap, when present, identifies the specific PDCP SNs in which to use the new key. The most significant bit of the first octet of the field FKS Bitmap indicates whether or not the PDCP data unit with the SN (FKS+1) modulo (Maximum_PDCP_SN+1) uses the new key. The least significant bit of the first octet of the field FKS Bitmap indicates whether or not the PDCP data unit with the SN (FKS+8) modulo (Maximum_PDCP_SN+1) uses the new key. The bit "0" may be used to indicate that the old key is to be used, and the bit "1" may be used to indicate that the new key is to be used.

RRC messages as well as PDCP Status Report messages could be sent using acknowledge mode RLC, meaning that losing the PDCP messages belongs to general abnormal cases and is not specific only to the on-the-fly key change. The recovery could depend upon the existing mechanism, such as timers, used for RRC and PDCP.

According to an embodiment the key use information is provided in a header of each PDCP layer packet.

Figure 10:
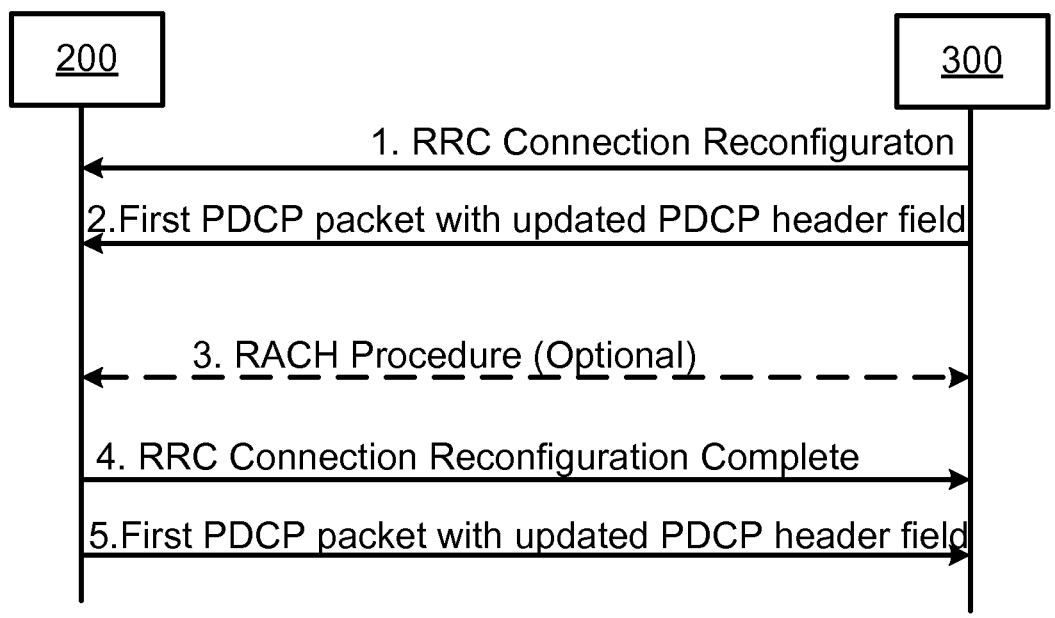
FIG. 10 is a signalling diagram according to an embodiment.

A variant of signaling/indicating which key is applied to the PDCP packets (e.g. key change information) is to include a flag or a counter in the PDCP header of normal user plane packets. In this way each packet will give an indication which key is to be used for decoding the packet. FIG. 10 illustrates the procedure where the network node 300 sends a packet with updated header field to the wireless device 200 (step 2) after a RRC connection reconfiguration message (step 1) and the wireless device 200 sends a packet with updated header field to the network node 300 (step 5) after a RRC connection reconfiguration complete message (step 4), and possibly after an optional RACH procedure (step 3).

Figure 11:
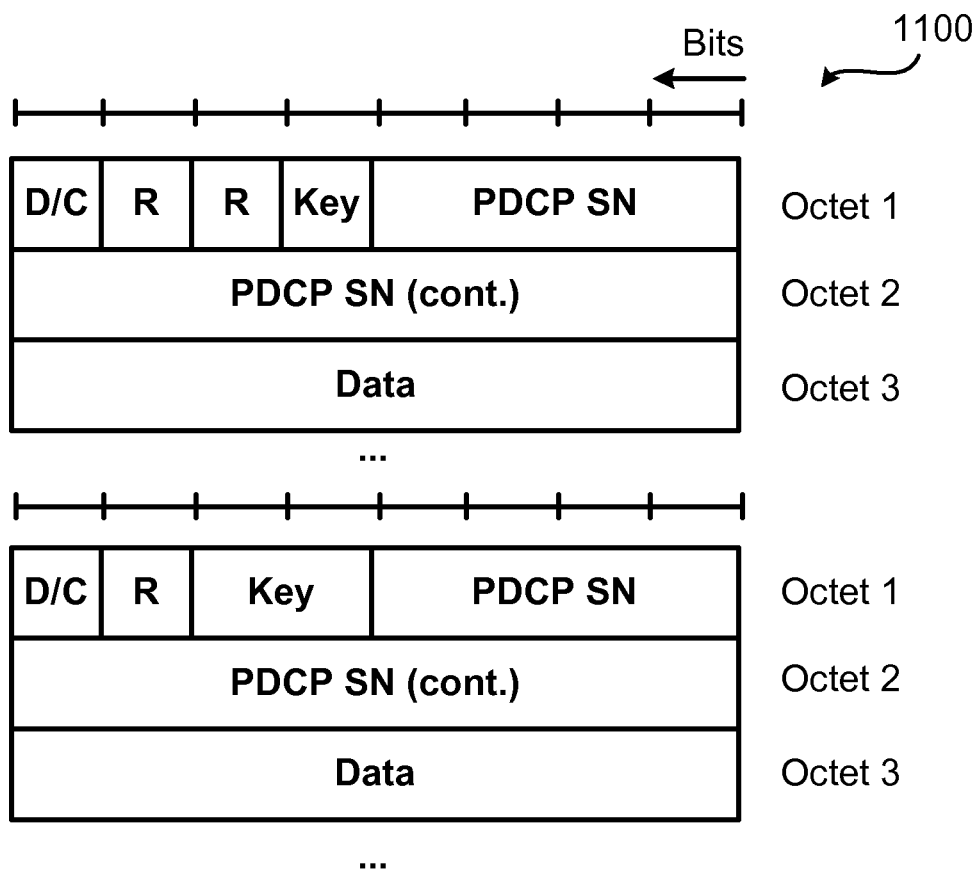
FIG. 11 is a schematic illustration of a data structure according to embodiments.

When the receiver receives packets with an updated header (e.g. a flag has been toggled or a counter has been incremented) it will know whether it should apply the new key or the old key. In case the receiver has not yet received a message indicating key change (where the receiver is the wireless device 200) or a message confirming key change (where the receiver is the network node 300) the receiver can wait decoding packets having an updated header. FIG. 11 shows a data structure 1100 of a possible header formats using the 12 bits PDCP SN header format as an example.

Hence, according to an embodiment the key use information is provided as a flag, and the flag is toggled or temporarily set to represent a replacement of the first key with the second key. In case there are only a first key and a second key, the flag can be represented by a single bit. However, as disclosed above, there could be further keys and hence more bits may be needed in order to represent the flag.

In case a single flag is used, it is possible that this flag will change its value after each key change. For example "flag=0" can be used for old packets that should be decoded with the old key and "flag=1" can be used for new packets that should be decoded with the new key. When the key changes yet another time, "flag=1" will be used for old packets and "flag=0" will be used for new packets.

Another variant is that the flag is combined with sequence numbers (e.g. PDCP SNs) such that the flag is only set to 1 (i.e., flag=1") for a short period (e.g. for new packets as long as there is still old packets in transits). The sender of the packets can re-set the flag to zero once it is certain that the receiver of the packets has received a packet with the flag set to 1. The receiver will be able to determine that the new packets with flag set to 0 are not old packets since the sequence number is higher than for the packets received with the flag set to 1.

One potential drawback with embodiments based on using a flag is that such embodiments may not allow the system to change the keys so frequently, especially if there are some radio bearers which do not send data so often. For this reason it could be possible to use a counter in the header, where the counter uses more than one bit in. In this way the network node 300 or wireless device 200 can change the key a couple of times before it has to worry about reusing an old counter value.

An advantage with embodiments based on using a flag is that the receiver of the packets will know immediately that a key change is expected, making it slightly easier to handle cases when the RRC message is delayed. E.g. the sender does not need to worry about the case that packet are received prior to message of the key change procedure, since the packets themselves indicate that they should be decode with the new key.

Figure 12:
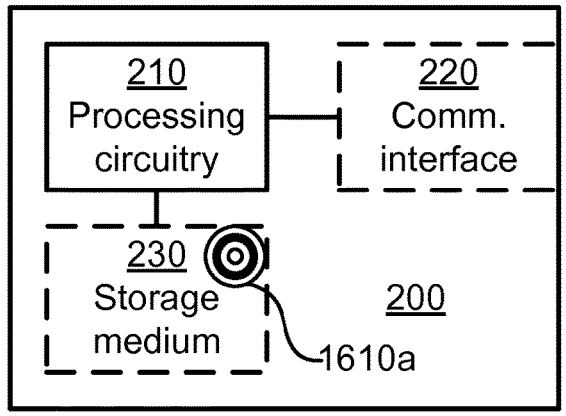
FIG. 12 is a schematic diagram showing functional units of a wireless device according to an embodiment.

FIG. 12 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1610*a* (as in FIG. 16), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, S102-S110, as disclosed above. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200 may further comprise a communications interface 220 for communications at least with the network node 300. As such the communications interface 220 may comprise one or more transmitters and receivers, comprising analogue and digital components.

The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 13:
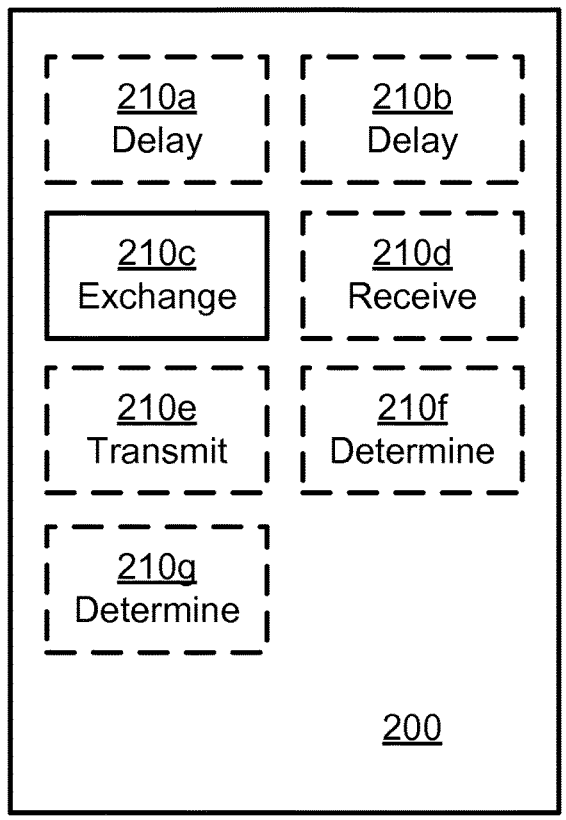
FIG. 13 is a schematic diagram showing functional modules of a wireless device according to an embodiment.

FIG. 13 schematically illustrates, in terms of a number of functional modules, the components of a wireless device 200 according to an embodiment. The wireless device 200 of FIG. 13 comprises an exchange module 210*c* configured to perform (optional) step S106. The wireless device 200 of FIG. 13 may further comprise a number of optional functional modules, such as any of a delay module 210*a* configured to perform (optional) step S102, a delay module 210*b* configured to perform (optional) step S104, a receive module 210*d* configured to perform (optional) step S106*a*, a transmit module 210*e* configured to perform (optional) step S106*b*, a determine module 210*f* configured to perform (optional) step S108, and a determine module 210*g* configured to perform (optional) step S110.

In general terms, each functional module 210*a*-210*g* may be implemented in hardware or in software. Preferably, one or more or all functional modules 210*a*-210*g* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*g* and to execute these instructions, thereby performing any steps of the wireless device 200 as disclosed herein.

Figure 14:
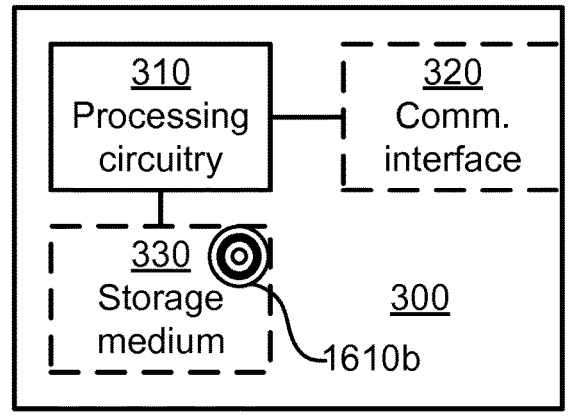
FIG. 14 is a schematic diagram showing functional units of a network node according to an embodiment.

FIG. 14 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1610*b* (as in FIG. 16), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, S202-S208, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical 310 memory, solid state memory or even remotely mounted memory.

The network node 300 may further comprise a communications interface 320 for communications at least with the wireless device 200. As such the communications interface 320 may comprise one or more transmitters and receivers, comprising analogue and digital components.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 15:
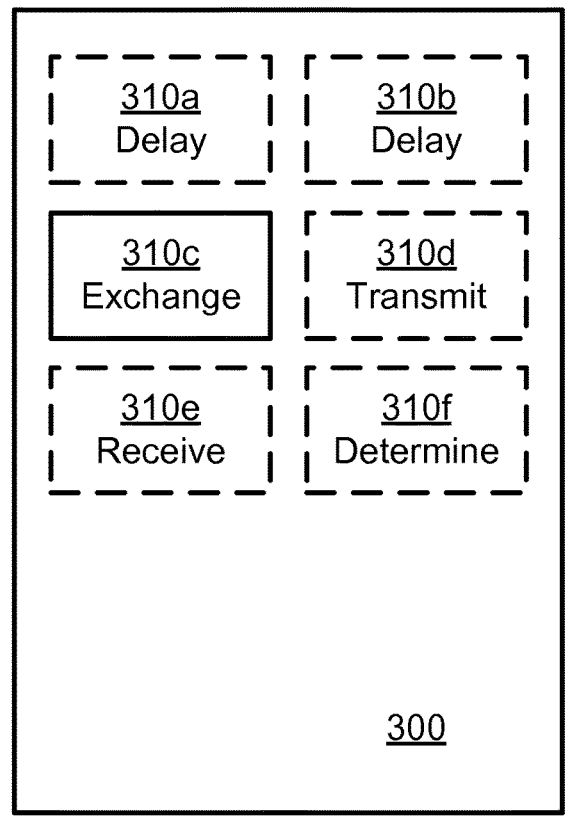
FIG. 15 is a schematic diagram showing functional modules of a network node according to an embodiment.

FIG. 15 schematically illustrates, in terms of a number of functional modules, the components of a network node 300 according to an embodiment. The network node 300 of FIG. 15 comprises an exchange module 310*c* configured to perform (optional) step S206. The network node 300 of FIG. 15 may further comprise a number of optional functional modules, such as any of a delay module 310*a* configured to perform (optional) step S202, a delay module 310*b* configured to perform (optional) step S204, a transmit module configured to perform (optional) step S206*a*, a receive module 310e configured to perform (optional) step S206b, and a determine module 310f configured to perform (optional) step S208. In general terms, each functional module 310a-310f may be implemented in hardware or in software. Preferably, one or more or all functional modules 310a-310f may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310f and to execute these instructions, thereby performing any steps of the network node 300 as disclosed herein.

The network node 300 may be provided as a standalone device or as a part of at least one further device. For example, the network node 300 may be provided in a node of the radio access network or in a node of the core network. Alternatively, functionality of the network node 300 may be distributed between at least two devices, or nodes. These at least two nodes, or devices, may either be part of the same network part (such as the radio access network or the core network) or may be spread between at least two such network parts. Thus, a first portion of the instructions performed by the network node 300 may be executed in a first device, and a second portion of the of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 14 the processing circuitry 310 may be distributed among a plurality of devices, or nodes. The same applies to the functional modules 310a-310f of FIG. 15 and the computer program 1620b of FIG. 16 (see below).

FIG. 16 shows one example of a computer program product 1610a, 1610b comprising computer readable means 1630. On this computer readable means 1630, a computer program 1620a can be stored, which computer program 1620a can cause the processing circuitry 210 and thereto operatively coupled entities and devices, such as the communications interface 220 and the storage medium 230, to execute methods according to embodiments described herein. The computer program 1620a and/or computer program product 1610a may thus provide means for performing any steps of the wireless device 200 as herein disclosed. On this computer readable means 1630, a computer program 1620b can be stored, which computer program 1620b can cause the processing circuitry 310 and thereto operatively coupled entities and devices, such as the communications interface 320 and the storage medium 330, to execute methods according to embodiments described herein. The computer program 1620b and/or computer program product 1610b may thus provide means for performing any steps of the network node 300 as herein disclosed.

In the example of FIG. 16, the computer program product 1610a, 1610b is illustrated as an optical disc, such as a CD (compact disc) or a DVD (digital versatile disc) or a Blu-Ray disc. The computer program product 1610a, 1610b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1620a, 1620b is here schematically shown as a track on the depicted optical disk, the computer program 1620a, 1620b can be stored in any way which is suitable for the computer program product 1610a, 1610b.

List of enumerated embodiments:

1. A method for configuring use of keys for security protecting packets communicated between a wireless device 200 and a network node 300, the method being performed by the wireless device 200, the method comprising:
   S106: exchanging key use information with the network node 300 in conjunction with performing a key change procedure with the network node 300 during which a first key is replaced with a second key,
   wherein the key use information indicates which of the packets are security protected using which of the first key and the second key.

2. The method according to item 1, wherein exchanging the key use information comprises:
   S106a: receiving the key use information from the network node 300, and
   wherein the key use information pertains to which of the first key and the second key are used for security protection of downlink packets.

3. The method according to item 1, wherein exchanging the key use information comprises:
   S106b: transmitting the key use information to the network node 300, and
   wherein the key use information pertains to which of the first key and the second key are used for security protection of uplink packets.

4. The method according to item 1, further comprising:
   S102: delaying transmission of those of the packets that are security protected using the second key until having exchanged the key use information.

5. The method according to item 1, further comprising:
   S104: delaying decoding of those of the packets that are received after the key change procedure until having exchanged the key use information.

6. The method according to item 1, further comprising:
   S108: determining to refrain from performing a random access procedure in response to exchanging the key use information or in absence of reception of mobility control information from the network node 300 in conjunction with performing the key change procedure.

7. The method according to item 1, further comprising:
   S110: determining to refrain from flushing buffers of received packets in response to exchanging the key use information or in absence of reception of mobility control information from the network node 300 in conjunction with performing the key change procedure.

8. A method for configuring use of keys for security protecting packets communicated between a wireless device 200 and a network node 300, the method being performed by the network node 300, the method comprising:
   S206: exchanging key use information with the wireless device 200 in conjunction with performing a key change procedure with the wireless device 200 during which a first key is replaced with a second key,
   wherein the key use information indicates which of the packets are security protected using which of the first key and the second key.

9. The method according to item 8, wherein exchanging the key use information comprises:
   S206a: transmitting the key use information to the wireless device 200, and wherein the key use information pertains to which of the first key and the second key are used for security protection of downlink packets.

10. The method according to item 8, wherein exchanging the key use information comprises:
S206b: receiving the key use information from the wireless device 200, and
wherein the key use information pertains to which of the first key and the second key are used for security protection of uplink packets.

11. The method according to item 8, further comprising:
S202: delaying transmission of those of the packets that are security protected using the second key until having exchanged the key use information.

12. The method according to item 8, further comprising:
S204: delaying decoding of those of the packets that are received after the key change procedure until having exchanged the key use information.

13. The method according to item 8, further comprising:
S208: determining to refrain from transmitting mobility control information to the wireless device 200 in response to exchanging the key use information.

14. The method according to any of the preceding items, wherein the first key and the second key are access stratum keys and are used for security protecting radio interface communication between the wireless device 200 and the network node 300.

15. The method according to any of the preceding items, wherein the key use information is exchanged using Radio Resource Control, RRC, layer signalling.

16. The method according to any of items 1 to 14, wherein the key use information is exchanged using Packet Data Convergence Protocol, PDCP, layer signalling.

17. The method according to item 16, wherein the exchange of key use information occurs in parallel to the key change procedure.

18. The method according to any of the preceding items, wherein the packets are Packet Data Convergence Protocol, PDCP, layer packets.

19. The method according to item 18, wherein the key use information is provided in a header of each PDCP layer packet.

20. The method according to item 19, wherein the key use information is provided as a flag, and wherein the flag is toggled or temporarily set to represent a replacement of the first key with the second key.

21. The method according to item 1, wherein the key exchange procedure is performed by exchanging Radio Resource Control, RRC, configuration messages between the wireless device 200 and the network node 300.

22. A wireless device 200 for configuring use of keys for security protecting packets communicated between the wireless device 200 and a network node 300, the wireless device 200 comprising processing circuitry 210, the processing circuitry being configured to cause the wireless device 200 to:
exchange key use information with the network node 300 in conjunction with performing a key change procedure with the network node 300 during which a first key is replaced with a second key,
wherein the key use information indicates which of the packets are security protected using which of the first key and the second key.

23. A wireless device 200 for configuring use of keys for security protecting packets communicated between the wireless device 200 and a network node 300, the wireless device 200 comprising:
processing circuitry 210; and
a storage medium 230 storing instructions that, when executed by the processing circuitry 210, cause the wireless device 200 to:
exchange key use information with the network node 300 in conjunction with performing a key change procedure with the network node 300 during which a first key is replaced with a second key,
wherein the key use information indicates which of the packets are security protected using which of the first key and the second key.

24. A wireless device 200 for configuring use of keys for security protecting packets communicated between the wireless device 200 and a network node 300, the wireless device 200 comprising:
an exchange module 210c configured to exchange key use information with the network node 300 in conjunction with performing a key change procedure with the network node 300 during which a first key is replaced with a second key,
wherein the key use information indicates which of the packets are security protected using which of the first key and the second key.

25. A network node 300 for configuring use of keys for security protecting packets communicated between a wireless device 200 and the network node 300, the network node 300 comprising processing circuitry 310, the processing circuitry being configured to cause the network node 300 to:
exchange key use information with the wireless device 200 in conjunction with performing a key change procedure with the wireless device 200 during which a first key is replaced with a second key,
wherein the key use information indicates which of the packets are security protected using which of the first key and the second key.

26. A network node 300 for configuring use of keys for security protecting packets communicated between a wireless device 200 and the network node 300, the network node 300 comprising:
processing circuitry 310, and
a storage medium 330 storing instructions that, when executed by the processing circuitry 310, cause the network node 300 to:
exchange key use information with the wireless device 200 in conjunction with performing a key change procedure with the wireless device 200 during which a first key is replaced with a second key,
wherein the key use information indicates which of the packets are security protected using which of the first key and the second key.

27. A network node 300 for configuring use of keys for security protecting packets communicated between a wireless device 200 and the network node 300, the network node 300 comprising:
an exchange module 300c configured to exchange key use information with the wireless device 200 in conjunction with performing a key change procedure with the wireless device 200 during which a first key is replaced with a second key,
wherein the key use information indicates which of the packets are security protected using which of the first key and the second key.

28. A computer program 1620a for configuring use of keys for security protecting packets communicated between a wireless device 200 and a network node 300, the computer program comprising computer code which, when run on processing circuitry 210 of the wireless device 200, causes the wireless device 200 to:

S106: exchange key use information with the network node 300 in conjunction with performing a key change procedure with the network node 300 during which a first key is replaced with a second key, wherein the key use information indicates which of the packets are security protected using which of the first key and the second key.

29. A computer program 1620b for configuring use of keys for security 310 protecting packets communicated between a wireless device 200 and a network node 300, the computer program comprising computer code which, when run on processing circuitry 310 of the network node 300, causes the network node 300 to:

S206: exchange key use information with the wireless device 200 in conjunction with performing a key change procedure with the wireless device 200 during which a first key is replaced with a second key,
wherein the key use information indicates which of the packets are security protected using which of the first key and the second key.

30. A computer program product 1610a, 1610b comprising a computer program 1620a, 1620b according to at least one of items 28 and 29, and a computer readable storage medium 1630 on which the computer program is stored.

The inventive concept has mainly been described above with reference to a few embodiments. However, as is readily appreciated by a person skilled in the art, other embodiments than the ones disclosed above are equally possible within the scope of the inventive concept, as defined by the list of enumerated embodiments and the appended list of claims. For example, although some embodiments have been described in terms of the LTE based systems the herein disclosed embodiments are equally applicable to future fifth generation telecommunications systems.

The invention claimed is:

1. A method for configuring use of keys for security protecting packets communicated between a first node and a second node, the method being performed by the first node, the method comprising:
exchanging key use information with the second node in conjunction with performing a key change procedure with the second node during which a first key is replaced with a second key, wherein
the key use information indicates which of the packets are security protected using which of the first key and the second key, and
the method further comprises:
determining to refrain from flushing buffers of received packets in response to exchanging the key use information or in absence of reception of mobility control information from the second node in conjunction with performing the key change procedure.

2. The method of claim 1, wherein exchanging the key use information comprises:
receiving the key use information from the second node, and
wherein the key use information pertains to which of the first key and the second key are used for security protection of downlink packets.

3. The method of claim 1, wherein exchanging the key use information comprises:
transmitting the key use information to the second node, and wherein the key use information pertains to which of the first key and the second key are used for security protection of uplink packets.

4. The method of claim 1, further comprising:
delaying transmission of those of the packets that are security protected using the second key until after having exchanged the key use information.

5. The method of claim 1, further comprising:
delaying decoding of those of the packets that are received after the key change procedure until after having exchanged the key use information.

6. The method of claim 1, further comprising:
determining to refrain from performing a random access procedure in response to exchanging the key use information or in absence of reception of mobility control information from the second node in conjunction with performing the key change procedure.

7. The method of claim 1, further comprising:
before exchanging the key use information, replacing the first key with the second key;
before exchanging the key use information and after replacing the first key with the second key, using the second key to security protect a first packet, thereby generating a first security protected packet;
after generating the first security protected packet, refraining from transmitting the first security protected packet until after first key use information is transmitted to the second node;
after generating the first security protected packet, transmitting to the second node the first key use information; and
after transmitting to the second node the first key use information, transmitting to the second node the first security protected packet.

8. The method of claim 1, wherein
the first node is a wireless terminal and the second node is a network node, or
the first node is the network node and the second node is the wireless terminal.

9. A method for configuring use of keys for security protecting packets communicated between a first node and a second node, the method being performed by the second node, the method comprising:
replacing a first key with a second key;
after replacing the first key with the second key, using the second key to security protect a first packet, thereby generating a first security protected packet;
after generating the first security protected packet, refraining from transmitting the first security protected packet to the first node until after first key use information is transmitted to the first node;
after generating the first security protected packet, transmitting to the first node the first key use information; and
after transmitting to the first node the first key use information, transmitting to the first node the first security protected packet,
wherein the first key use information indicates that the first security protected packet is security protected using the second key.

10. The method of claim 9, wherein exchanging the key use information comprises:
transmitting the key use information to the first node, and
wherein the key use information pertains to which of the first key and the second key are used for security protection of downlink packets.

11. The method of claim 9, wherein exchanging the key use information comprises:
receiving the key use information from the first node, and wherein the key use information pertains to which of the first key and the second key are used for security protection of uplink packets.

12. The method of claim 9, further comprising:
delaying transmission of those of the packets that are security protected using the second key until after having exchanged the key use information.

13. The method of claim 9, further comprising:
after replacing the first key with the second key, receiving a second security protected packet transmitted by the first node;
refraining from decoding the second security protected packet until after receiving from the first node second key use information;
receiving from the first node the second key use information; and
after receiving from the first node the second key use information, decoding the second security protected packet, wherein
the second key use information indicates either: i) that the first key was used to generate the second security protected packet or ii) that the second key was used to generate the second security protected packet.

14. The method of claim 9, further comprising:
determining to refrain from transmitting mobility control information to the first node in response to exchanging the key use information.

15. The method of claim 9, wherein the first key and the second key are access stratum keys and are used for security protecting radio interface communication between the first node and the second node.

16. The method of claim 9, wherein the key use information is exchanged using Radio Resource Control (RRC) layer signalling.

17. The method of claim 9, wherein the packets are Packet Data Convergence Protocol (PDCP) layer packets.

18. The method of claim 9, wherein the key exchange procedure is performed by exchanging Radio Resource Control, RRC, configuration messages between the first node and the second node.

19. A wireless device for configuring use of keys for security protecting packets communicated between the first node and a network node, the first node comprising:
processing circuitry; and
a storage medium storing instructions that, when executed by the processing circuitry, cause the first node to:
exchange key use information with the second node in conjunction with performing a key change procedure with the second node during which a first key is replaced with a second key, wherein the key use information indicates which of the packets are security protected using which of the first key and the second key, and
determine to refrain from flushing buffers of received packets in response to exchanging the key use information or in absence of reception of mobility control information from the second node in conjunction with performing the key change procedure.

20. A network node for configuring use of keys for security protecting packets communicated between a wireless device and the second node, the second node comprising:
processing circuitry; and
a storage medium storing instructions that, when executed by the processing circuitry, cause the second node to:
replace a first key with a second key;
after replacing the first key with the second key, use the second key to security protect a first packet, thereby generating a first security protected packet;
after generating the first security protected packet, refrain from transmitting the first security protected packet to the first node until after first key use information is transmitted to the first node;
after generating the first security protected packet, transmitting to the first node the first key use information; and
after transmitting to the first node the first key use information, transmitting to the first node the first security protected packet, wherein the first key use information indicates that the first security protected packet is security protected using the second key.

* * * * *